(12) United States Patent
Cihlar et al.

(10) Patent No.: US 8,813,501 B2
(45) Date of Patent: Aug. 26, 2014

(54) COMBUSTOR ASSEMBLIES FOR USE IN TURBINE ENGINES AND METHODS OF ASSEMBLING SAME

(75) Inventors: David William Cihlar, Greenville, SC (US); Ronald James Chila, Greer, SC (US); Mert Enis Berkman, Greenville, SC (US)

(73) Assignee: General Electric Company, Schenectady, NY (US)

( * ) Notice: Subject to any disclaimer, the term of this patent is extended or adjusted under 35 U.S.C. 154(b) by 906 days.

(21) Appl. No.: 12/983,393

(22) Filed: Jan. 3, 2011

(65) Prior Publication Data

US 2012/0167571 A1    Jul. 5, 2012

(51) Int. Cl.
| F02C 1/00 | (2006.01) |
| F02G 3/00 | (2006.01) |
| F01D 9/02 | (2006.01) |
| F02C 7/22 | (2006.01) |
| F23R 3/06 | (2006.01) |
| F23R 3/54 | (2006.01) |
| F23R 3/00 | (2006.01) |

(52) U.S. Cl.
CPC . *F01D 9/023* (2013.01); *F23R 3/06* (2013.01); *F23R 3/54* (2013.01); *F23R 3/002* (2013.01); *F02C 7/22* (2013.01)
USPC ................... 60/752; 60/760; 60/754

(58) Field of Classification Search
CPC ............ F01D 9/023; F23R 3/54; F23R 3/002; F23R 3/06; F02C 7/22
USPC .................................... 60/752–760
See application file for complete search history.

(56) References Cited

U.S. PATENT DOCUMENTS

| 4,896,510 | A  * | 1/1990  | Foltz ............................... 60/757 |
| 4,901,522 | A  * | 2/1990  | Commaret et al. ............. 60/800 |
| 5,598,697 | A  * | 2/1997  | Ambrogi et al. ................ 60/782 |
| 6,098,397 | A  * | 8/2000  | Glezer et al. .................... 60/772 |
| 6,655,146 | B2   | 12/2003 | Kutter et al. |
| 6,681,578 | B1   | 1/2004  | Bunker |
| 6,792,757 | B2   | 9/2004  | Borns et al. |
| 7,010,921 | B2   | 3/2006  | Intile et al. |
| 7,269,957 | B2   | 9/2007  | Martling et al. |
| 7,296,967 | B2   | 11/2007 | Shapiro |
| 7,493,767 | B2   | 2/2009  | Bunker et al. |
| 7,571,611 | B2   | 8/2009  | Johnson et al. |
| 7,631,502 | B2   | 12/2009 | Burd et al. |
| 8,051,663 | B2 * | 11/2011 | Tuthill ............................. 60/755 |
| 8,056,342 | B2 * | 11/2011 | Shelley et al. .................. 60/752 |
| 8,307,656 | B2 * | 11/2012 | Tuthill ............................. 60/755 |
| 8,307,657 | B2 * | 11/2012 | Chila ............................... 60/757 |

(Continued)

*Primary Examiner* — William H Rodriguez
(74) *Attorney, Agent, or Firm* — Armstrong Teasdale LLP (57) ABSTRACT

A method of assembling a combustor assembly for use in a turbine engine is provided. A combustor liner that defines a combustion chamber therein is provided. The liner includes a forward end and an aft end, wherein the aft end includes at least one channel extending therethrough. The channel is aligned obliquely with respect to a centerline extending through the aft end. A plurality of fuel nozzles are coupled to the forward end such that the fuel nozzles extend through the forward end. An annular sleeve that includes at least one opening extending radially therethrough is coupled to the aft end, wherein the sleeve substantially circumscribes the aft end such that a cavity is defined therebetween and such that a fluid channeled through the at least one opening impinges against a surface of the aft end prior to the fluid being channeled into the combustion chamber.

20 Claims, 4 Drawing Sheets

(56) References Cited

U.S. PATENT DOCUMENTS

| | | | |
|---|---|---|---|
| 8,499,566 B2* | 8/2013 | Lacy et al. | 60/754 |
| 8,572,983 B2* | 11/2013 | Xu | 60/752 |
| 8,590,314 B2* | 11/2013 | McMahan et al. | 60/752 |
| 2006/0053798 A1* | 3/2006 | Hadder | 60/772 |
| 2009/0120096 A1* | 5/2009 | Tuthill | 60/755 |
| 2009/0145132 A1 | 6/2009 | Johnson et al. | |
| 2009/0282833 A1* | 11/2009 | Hessler et al. | 60/757 |
| 2010/0107645 A1 | 5/2010 | Kolatti | |
| 2010/0170256 A1 | 7/2010 | Kaleeswaran et al. | |
| 2010/0186415 A1 | 7/2010 | Brown et al. | |
| 2010/0205972 A1 | 8/2010 | Chila et al. | |
| 2012/0034075 A1* | 2/2012 | Hsu et al. | 415/178 |
| 2012/0102960 A1* | 5/2012 | Tuthill | 60/755 |
| 2012/0255308 A1* | 10/2012 | Chandler et al. | 60/754 |

* cited by examiner

COMBUSTOR ASSEMBLIES FOR USE IN TURBINE ENGINES AND METHODS OF ASSEMBLING SAME

BACKGROUND OF THE INVENTION

The field of the present invention relates generally to turbine engines and, more particularly, to combustor assemblies for use in turbine engines.

At least some known turbine engines, such as gas turbine engines, use cooling air to cool a combustion system used within the engine. Often the cooling air is supplied from a compressor coupled in flow communication upstream from the combustion system. More specifically, in at least some known turbine engines, cooling air is discharged from the compressor into a plenum that extends at least partially around a transition piece of a combustor assembly. A portion of cooling air entering the plenum is supplied to an impingement sleeve that circumscribes the transition piece, prior to the cooling air being channeled into a channel defined between the impingement sleeve and the transition piece. Cooling air entering the cooling channel is then discharged downstream into a second channel defined between a combustor liner and a flowsleeve.

Any remaining cooling air entering the plenum is channeled through inlets defined within the flowsleeve prior to being discharged downstream into the second channel. Cooling air flowing through the second channel cools an exterior portion of the combustor liner. Providing cooling air to a combustor liner is necessary during operation of the turbine engine, as the liner may operate within one of the highest temperatures as compared to other turbine engine components. More specifically, to prevent thermal differential stresses, it is important to cool the entire combustor liner. However, providing cooling air to an aft end of a combustor liner may be difficult, as the aft end is generally radially inward of an interface of the combustor liner and the transition piece. The inability to effectively cool the aft end of the combustor liner may result in thermal cracking, thermal differential stresses, and/or damage to the combustor liner, all of which may reduce the overall useful life of the combustor liner and/or increase the cost of maintaining and operating the turbine engine.

BRIEF DESCRIPTION OF THE INVENTION

In one embodiment, a method of assembling a combustor assembly for use in a turbine engine is provided. The method includes providing a combustor liner that defines a combustion chamber therein. The combustor liner includes a forward end and an aft end, wherein the aft end includes at least one channel that extends therethrough. The channel is aligned obliquely with respect to a centerline extending through the aft end. A plurality of fuel nozzles are coupled to the forward end such that the fuel nozzles extend through the forward end. An annular sleeve that includes at least one opening extending radially therethrough is coupled to the aft end, wherein the sleeve substantially circumscribes the aft end such that a cavity is defined therebetween and such that a fluid channeled through the at least one opening impinges against a surface of the aft end prior to the fluid being channeled into the combustion chamber.

In another embodiment, a combustor assembly for use in a turbine engine is provided. The combustor assembly includes a combustor liner that defines a combustion chamber therein. The combustor liner includes a forward end and an aft end, wherein the aft end includes at least one channel extending therethrough. The channel is aligned obliquely with respect to a centerline extending through the aft end. Moreover, the combustor assembly includes a plurality of fuel nozzles that extend through the forward end. The combustor assembly also includes an annular sleeve that substantially circumscribes the aft end such that a cavity is defined between the sleeve and the aft end, wherein the sleeve includes at least one opening extending radially therethrough. The opening is oriented such that a fluid channeled therethrough impinges against a surface of the aft end prior to the fluid being channeled into the combustion chamber.

In another embodiment, a turbine engine is provided. The turbine engine includes a compressor and a combustor that is coupled in flow communication with the compressor. The combustor includes at least one combustor assembly. The combustor assembly includes a combustor liner that defines a combustion chamber therein. The combustor liner includes a forward end and an aft end, wherein the aft end includes at least one channel extending therethrough. The channel is aligned obliquely with respect to a centerline extending through the aft end. Moreover, the combustor assembly includes a plurality of fuel nozzles that extend through the forward end. The combustor assembly also includes an annular sleeve that substantially circumscribes the aft end such that a cavity is defined between the sleeve and the aft end, wherein the sleeve includes at least one opening extending radially therethrough. The opening is oriented such that a fluid channeled therethrough impinges against a surface of the aft end prior to the fluid being channeled into the combustion chamber.

DETAILED DESCRIPTION OF THE INVENTION

The exemplary methods and systems described herein overcome at least some disadvantages of known combustor assemblies by providing a combustor assembly that effectively cools a combustor liner and, more particularly, cools an aft end of a combustor liner. More specifically, the embodiments described herein provide a combustor liner that includes at least one channel that extends through an aft end of the liner, wherein the channel is aligned obliquely with respect to a centerline that extends through the aft end. Moreover, an annular sleeve that includes at least one opening substantially circumscribes the aft end of the combustor liner such that a cavity is defined between the sleeve and the aft end. The sleeve opening is oriented to enable a fluid, such as air, channeled through the opening to impinge against the aft end prior to the fluid being channeled into a combustion chamber. When the fluid impinges against the aft end, the fluid deflects off a surface of the aft end and is dispersed throughout the cavity to facilitate substantially reducing the temperature within the aft end of the combustor liner.

Figure 1:
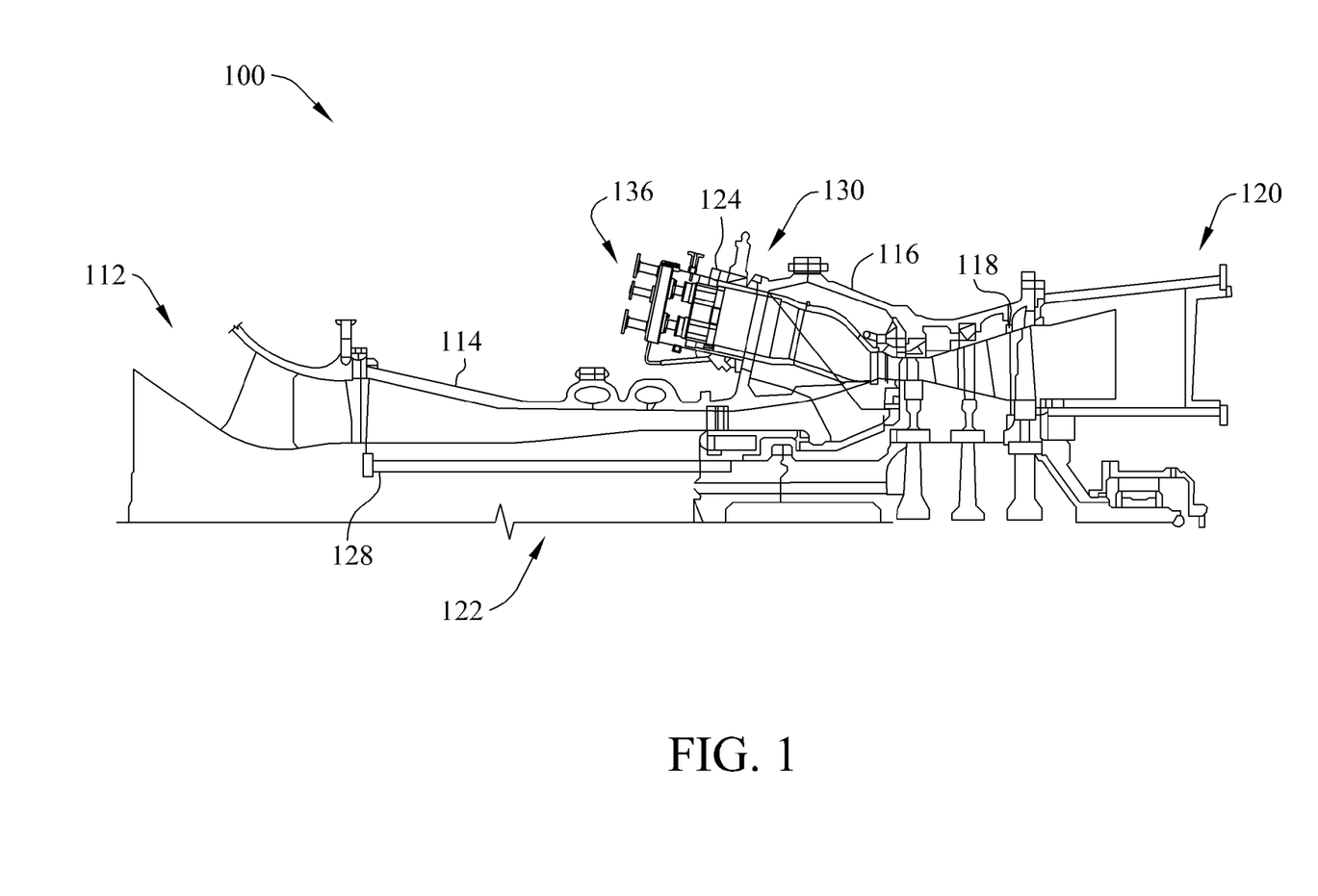
FIG. 1 is a schematic cross-sectional view of an exemplary turbine engine.

FIG. 1 is a schematic cross-sectional view of a turbine engine 100. In the exemplary embodiment, turbine engine 100 is a gas turbine engine. While the exemplary embodiment illustrates a gas turbine engine, the present invention is not limited to any one particular engine, and one of ordinary skill in the art will appreciate that the current invention may be used in connection with other turbine engines.

In the exemplary embodiment, turbine engine 100 includes an intake section 112, a compressor section 114 that is downstream from intake section 112, a combustor section 116 downstream from compressor section 114, a turbine section 118 downstream from combustor section 116, and an exhaust section 120 downstream from turbine section 118. Turbine section 118 is coupled to compressor section 114 via a rotor assembly 122 that includes a shaft 128. Combustor section 116 includes at least one combustor assembly 130 that is coupled in flow communication with the compressor section 114. A fuel nozzle assembly 136 is coupled to combustor assembly 130. Turbine section 118 is rotatably coupled to compressor section 114 and to a load (not shown) such as, but not limited to, an electrical generator and/or a mechanical drive application.

During operation, air flows through compressor section 114 and compressed air is discharged into combustor section 116. Combustor assembly 130 injects fuel, for example, natural gas and/or fuel oil, into the air flow, ignites the fuel-air mixture to expand the fuel-air mixture through combustion, and generates high temperature combustion gases. Combustion gases are discharged from combustor assembly 130 towards turbine section 118, wherein thermal energy in the gases is converted to mechanical rotational energy. Combustion gases impart rotational energy to turbine section 118 and to rotor assembly 122, which subsequently provides rotational power to compressor section 114.

Figure 2:
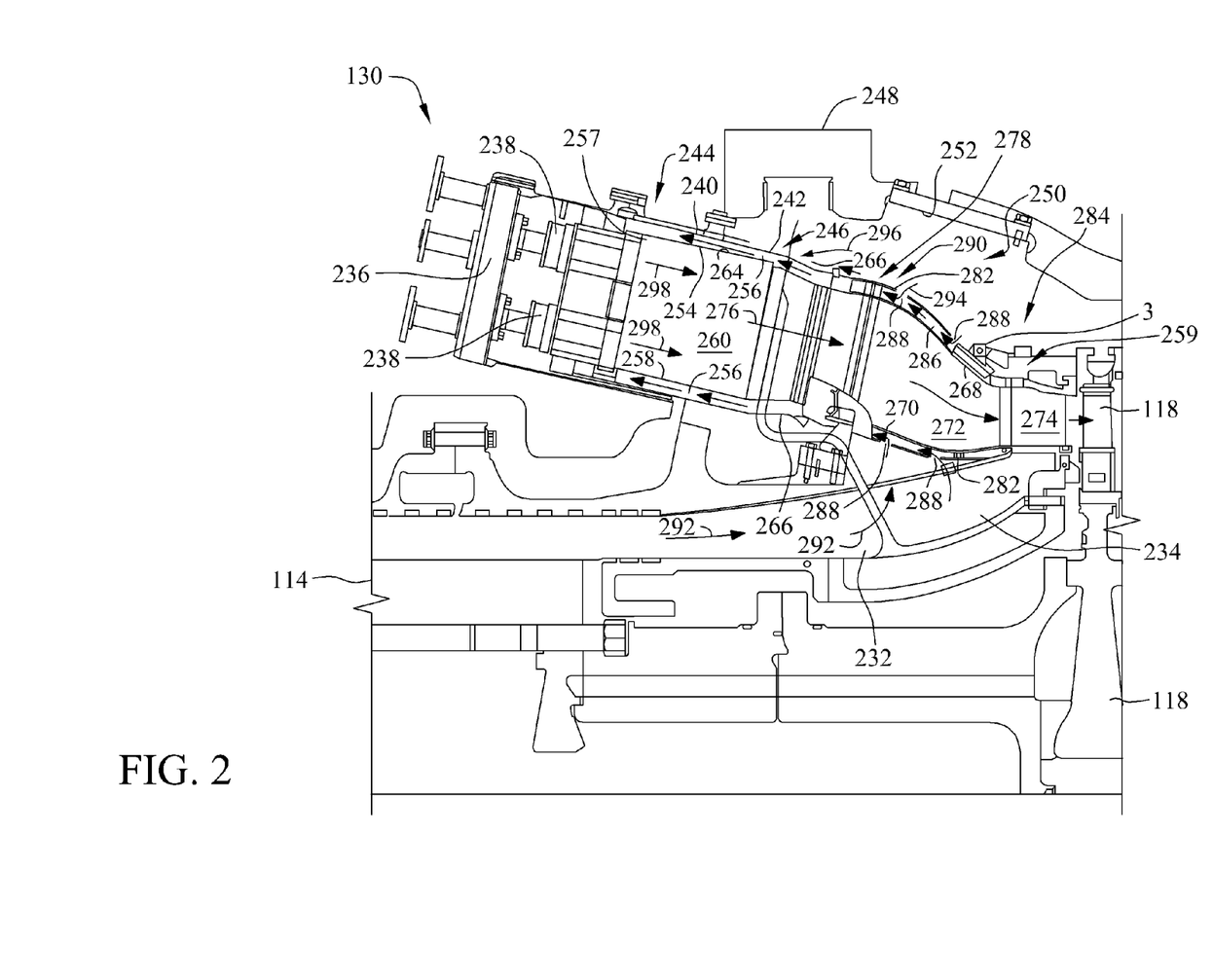
FIG. 2 is an enlarged cross-sectional view of a portion of an exemplary combustor assembly that may be used with the turbine engine shown in FIG. 1.

FIG. 2 is an enlarged cross-sectional view of a portion of combustor assembly 130. In the exemplary embodiment, combustor assembly 130 is coupled in flow communication with turbine section 118 and with compressor section 114. Moreover, in the exemplary embodiment, compressor section 114 includes a diffuser 232 that is coupled in flow communication with a discharge plenum 234. Plenum 234 directs air downstream from compressor section 114 towards combustor assembly 130.

In the exemplary embodiment, combustor assembly 130 includes a substantially circular dome plate 236 that at least partially supports a plurality of fuel nozzles 238. Dome plate 236 is coupled to a substantially cylindrical combustor flowsleeve 240 that has an outer surface 242 that extends between a forward section 244 and an aft section 246. A combustor casing 248 is coupled to outer surface 242, and flowsleeve 240 is at least partially positioned within a chamber 250 defined by a casing inner surface 252. More specifically, in the exemplary embodiment, combustor casing 248 is coupled to flowsleeve 240 between forward section 244 and aft section 246. Moreover, forward section 244 is coupled to dome plate 236, such that chamber 250 is oriented in flow communication with plenum 234 to enable a flow of air from compressor section 114 to be channeled to flowsleeve 240. A substantially cylindrical combustor liner 254 positioned within flowsleeve 240 is coupled to, and is supported by, flowsleeve 240. More specifically, in the exemplary embodiment, flowsleeve 240 is coupled radially outward from combustor liner 254 such that an annular cooling passage 256 is defined between flowsleeve 240 and combustor liner 254. Flowsleeve 240 and combustor casing 248 substantially isolate combustor liner 254 and its associated combustion processes from surrounding turbine components.

In the exemplary embodiment, combustor liner 254 includes a substantially cylindrically-shaped inner surface 258 that defines an annular combustion chamber 260. Combustor liner 254 has a forward end 257 and an aft end 259. In the exemplary embodiment, liner forward end 257 is coupled to fuel nozzles 238 such that fuel nozzles 238 extend through forward end 257 to channel fuel into combustion chamber 260. Annular cooling passage 256 channels cooling fluid across an outer surface 264 of combustor liner 254 towards fuel nozzles 238. In the exemplary embodiment, flowsleeve 240 includes an inlet opening 266 that defines a flow path into cooling passage 256.

A transition piece 268 is coupled to combustor liner 254 for use in channeling combustion gases from combustor liner 254 towards turbine section 118. In the exemplary embodiment, transition piece 268 includes an inner surface 270 that defines a guide cavity 272 that channels combustion gases from combustion chamber 260 downstream towards a turbine nozzle 274. A combustion flow path 276 is defined within combustor liner inner surface 258. Combustion gases generated within combustion chamber 260 are channeled via path 276 towards transition piece 268. An upstream end 278 of transition piece 268 is coupled to liner aft end 259. In one embodiment, combustor liner 254 is at least partially inserted into upstream end 278 to enable combustion chamber 260 to be positioned in flow communication with guide cavity 272, and such that combustion chamber 260 and guide cavity 272 are substantially isolated from plenum 234.

An impingement sleeve 282 is spaced radially outward from transition piece 268. More specifically, a downstream end 284 of impingement sleeve 282 is coupled to transition piece 268 such that impingement sleeve 282 is positioned radially outward from transition piece 268, and such that a transition piece cooling passage 286 is defined between impingement sleeve 282 and transition piece 268. A plurality of openings 288 extend through impingement sleeve 282 to enable a portion of air discharged from compressor discharge plenum 234 to be channeled into cooling passage 286. In the exemplary embodiment, an upstream end 290 of impingement sleeve 282 is aligned substantially concentrically with respect to flowsleeve 240 to enable cooling fluid to be channeled from cooling passage 286 into cooling passage 256.

During operation, compressor section 114 is driven by turbine section 118 via shaft 128 (shown in FIG. 1). As compressor section 114 rotates, compressed air 292 is discharged into diffuser 232. In the exemplary embodiment, the majority of compressed air 292 discharged from compressor section 114 into diffuser 232 is channeled through compressor discharge plenum 234 towards combustor assembly 130. A smaller portion of compressed air 292 discharged from compressor section 114 is channeled downstream for use in cooling turbine engine 100 components. More specifically, a first flow 294 of pressurized compressed air 292 within plenum 234 is channeled into cooling passage 286 through impingement sleeve openings 288. The air 294 is then channeled through cooling passage 286 prior to being discharged into cooling passage 256. In addition, a second flow 296 of pressurized compressed air 292 is channeled around impingement sleeve 282 and is discharged into cooling passage 256 through inlet opening 266. Air 296 entering inlet opening 266 and air 294 from transition piece cooling passage 286 is then mixed within cooling passage 256 prior to being discharged from cooling passage 256 towards fuel nozzles 238. The air 292 is mixed with fuel injected from fuel nozzles 238 and is ignited within combustion chamber 260 to form combustion gases 298. Combustion gases 298 are channeled from chamber 260 through transition piece guide cavity 272 towards turbine nozzle 274.

Figure 3:
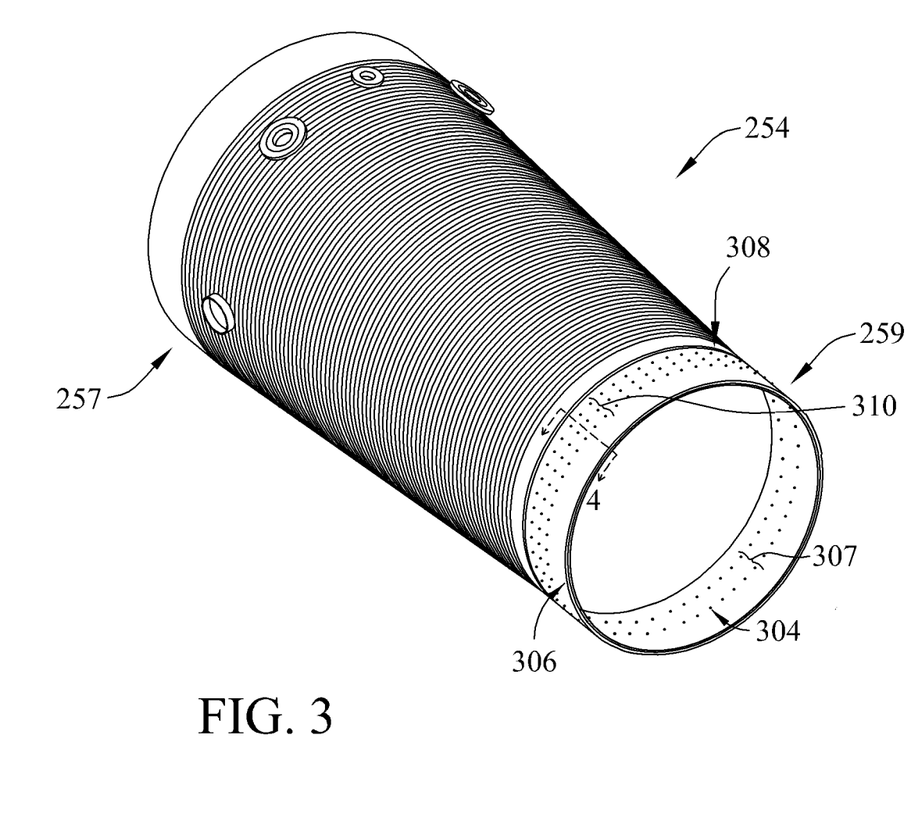
FIG. 3 is an enlarged partially exploded perspective view of a portion of the combustor assembly shown in FIG. 2 and taken along area 3.

FIG. 3 is an enlarged partially exploded perspective view of a portion of combustor assembly 130 taken along area 3 (shown in FIG. 2). Combustor liner 254 includes forward end 257 and aft end 259. Liner aft end 259 includes at least one channel 304 that extends through aft end 259. In the exemplary embodiment, aft end 259 includes a plurality of channels 304 that are oriented such that two rows 307 of channels 304 extend substantially circumferentially about aft end 259. Alternatively, aft end 259 may include any number of channels 304 and any number of rows 307 of channels 304 that enable combustor assembly 130 to function as described herein. Moreover, channels 304 may be spaced and/or oriented in any manner about aft end 259 that enables combustor assembly 130 to function as described herein.

Moreover, in the exemplary embodiment, combustor assembly 130 includes an annular aft end sleeve 306 that is coupled to aft end 259 such that aft end sleeve 306 substantially circumscribes liner aft end 259. More specifically, aft end sleeve 306 substantially circumscribes liner aft end 259 such that a cavity (not shown in FIG. 3) is defined between aft end sleeve 306 and aft end 259.

In the exemplary embodiment, aft end sleeve 306 includes at least one opening 308 that extends generally radially through aft end sleeve 306. In the exemplary embodiment, aft end sleeve 306 includes a plurality of openings 308 that are oriented such that three rows 310 of openings 308 are spaced substantially circumferentially about aft end sleeve 306. Alternatively, aft end sleeve 306 may include any number of openings 308 and any number of rows 310 of openings 308 that enables combustor assembly 130 to function as described herein. Moreover, openings 308 may be spaced and/or oriented in any manner about aft end sleeve 306 that enables combustor assembly 130 to function as described herein.

Figure 4:
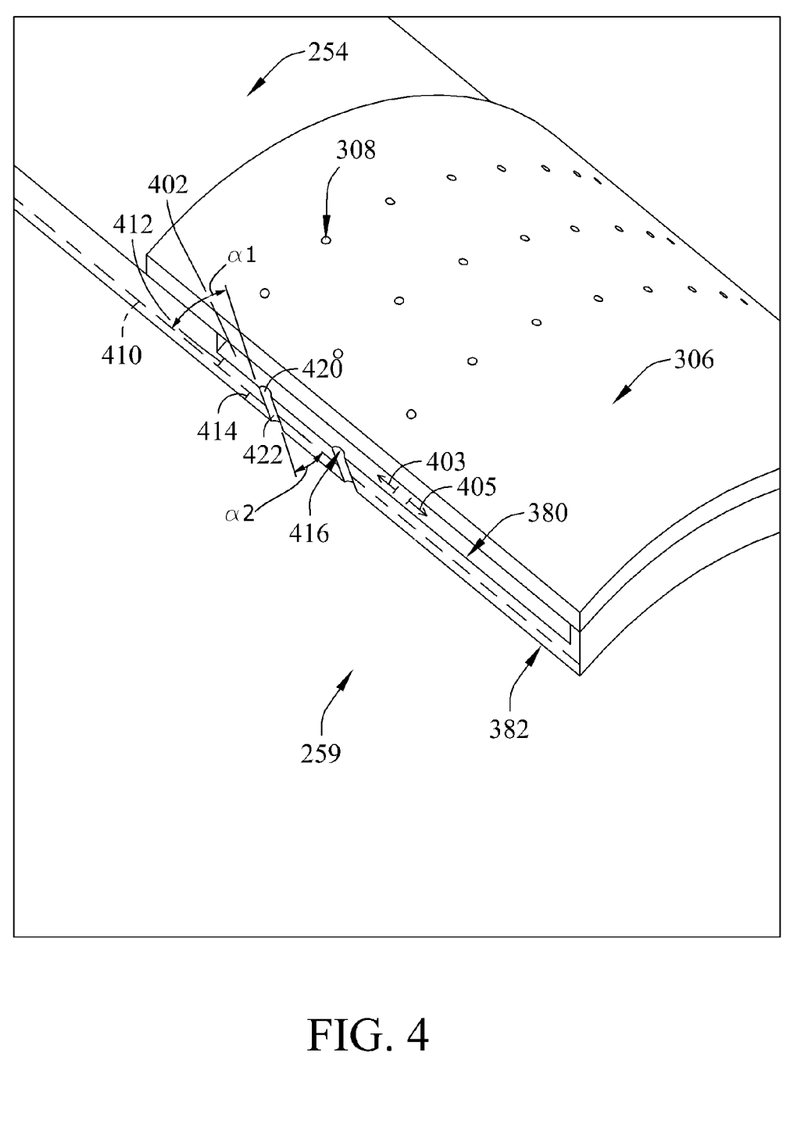
FIG. 4 is an enlarged cross-sectional view of a portion of the combustor assembly shown in FIG. 3 and taken along line 4-4.

FIG. 4 is an enlarged cross-sectional view of a portion of combustor assembly 130 taken along line 4-4 (shown in FIG. 3). Aft end 259 includes an exterior surface 380 and an interior surface 382. Aft end sleeve 306 substantially circumscribes liner aft end 259 such that a cavity 402 is defined between aft end sleeve 306 and aft end exterior surface 380.

In the exemplary embodiment, each channel 304 extends from exterior surface 380 to aft end interior surface 382. Moreover, in the exemplary embodiment, each opening 308 is oriented substantially obliquely with respect to each channel 304. More specifically, each opening 308 is oriented with respect to each channel 304 such that fluid channeled through openings 308 impinges against aft end exterior surface 380 prior to the fluid being channeled into combustion chamber 260. Such impingement facilitates the fluid being deflected and dispersed substantially within cavity 402 in both a first direction 403 and a different second direction 405 prior to the fluid being channeled into combustion chamber 260.

Moreover, in the exemplary embodiment, a centerline 410 extends axially through aft end 259. Centerline 410 bisects aft end 259 defining an upstream portion 412 of aft end 259 and a downstream portion 414 of aft end 259. More specifically, in the exemplary embodiment, aft end upstream portion 412 extends from aft end exterior surface 380 to centerline 410 and aft end downstream portion 414 extends from centerline 410 to aft end interior surface 382. Moreover, in the exemplary embodiment, aft end upstream portion 412 is substantially symmetrical with aft end downstream portion 414 with respect to centerline 410. Moreover, each channel 304 extends from aft end upstream portion 412 to aft end downstream portion 414. Further, each channel 304 has an upstream portion 420 and a downstream portion 422 that are oriented such that channel upstream portion 420 extends from aft end exterior surface 380 to centerline 410, and channel downstream portion 422 extends from centerline 410 to aft end interior surface 382.

In the exemplary embodiment, each channel 304 is aligned obliquely with respect to centerline 410 such that an oblique flow path 416 is defined therein. More specifically, channel upstream portion 420 is oriented at an angle $\alpha_1$ relative to centerline 410 and channel downstream portion 422 is oriented at an angle $\alpha_2$ relative to centerline 410. Alternatively, each channel 304 may have a circumferential angle. For example, channel upstream portion 420 and channel downstream portion 422 may define angles in a circumferential direction. Moreover, in the exemplary embodiment, angles $\alpha_1$ and $\alpha_2$ are congruent. More specifically, in the exemplary embodiment, angles $\alpha_1$ and $\alpha_2$ are each approximately equal to 45 degrees. Alternatively, angles $\alpha_1$ and $\alpha_2$ may be equal to any angle that enables combustor assembly 130 to function as described herein.

During operation, compressor section 114 (shown in FIGS. 1 and 2) is driven by turbine section 118 (shown in FIGS. 1 and 2) via shaft 128 (shown in FIG. 1). As compressor section 114 rotates, compressed air 292 (shown in FIG. 2) is discharged into diffuser 232 (shown in FIG. 2). In the exemplary embodiment, the majority of compressed air 292 discharged from compressor section 114 into diffuser 232 is channeled through compressor discharge plenum 234 (shown in FIG. 2) towards combustor assembly 130. As air 292 is channeled to towards combustor assembly 130, a portion of air 292 is channeled toward liner aft end 259 via plenum 234.

In the exemplary embodiment, when air 292 is channeled towards liner aft end 259, a portion of air 292 flows radially through sleeve openings 308 into cavity 402. Air 292 then impinges against exterior surface 380 of liner aft end 259 and is deflected and dispersed substantially axially within cavity 402 in first and second directions 403 and 405, respectively. Air 292 is then channeled through each channel 304 into combustion chamber 260, wherein the air 292 facilitates substantially reducing the temperature within combustor liner 254. More specifically, air 292 facilitates substantially reducing the operating temperature within liner aft end 259. Moreover, an annular seal (not shown) that is generally coupled to aft end 259 is no longer necessary on the aft end 259 and can be coupled to another portion of combustor liner 254. Without this seal, more air 292 is able to flow within aft end 259.

The above-described combustor assembly may be used with turbine engines to substantially cool a combustor liner and, in particular, substantially cool an aft end of a combustor liner contained within the combustor assembly. More specifically, the embodiments described herein provide a combustor liner that includes at least one channel that extends through an aft end of the liner. In contrast to known combustor assemblies, the channel described herein is aligned obliquely with respect to a centerline that extends through the aft end. Moreover, an annular sleeve that includes at least one opening substantially circumscribes the aft end of the combustor liner such that a cavity is defined between the sleeve and the aft end. In contrast to known combustor assemblies, the sleeve opening described herein is oriented to enable a fluid, such as air, channeled through the opening to impinge against the aft end prior to the fluid being channeled into a combustion chamber. When the fluid impinges against the aft end, the fluid deflects off a surface of the aft end and is dispersed throughout the cavity to facilitate substantially reducing the temperature within the aft end of the combustor liner. Accordingly, the combustor assembly is enabled to effectively cool the aft end of the combustor liner as compared to known combustor assemblies. Moreover, by effectively cooling the aft end of the combustor liner, thermal cracking, thermal differential stresses, and/or damage to the combustor liner may be substantially reduced and/or prevented.

Exemplary embodiments of a combustor assembly and method of assembling same are described above in detail. The combustor assembly and method of assembling same are not limited to the specific embodiments described herein, but rather, components of the combustor assembly and/or steps of the combustor assembly may be utilized independently and separately from other components and/or steps described herein. For example, the combustor assembly may also be used in combination with other machines and methods, and is not limited to practice with only a turbine engine as described herein. Rather, the exemplary embodiment can be implemented and utilized in connection with many other systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a combustor assembly for use in a turbine engine, said method comprising:
   providing a combustor liner that defines a combustion chamber therein, wherein the combustor liner includes a forward end and an aft end, wherein the aft end includes at least one channel extending therethrough, wherein the at least one channel is aligned obliquely with respect to a centerline extending through the aft end;
   coupling a plurality of fuel nozzles to the forward end such that the plurality of fuel nozzles extend through the forward end; and
   coupling an annular sleeve to the aft end, wherein the sleeve includes at least one opening extending radially therethrough, the sleeve substantially circumscribes the aft end such that a cavity is defined therebetween and such that a fluid channeled through the at least one opening impinges against a surface of the aft end that is substantially parallel to the sleeve, wherein the fluid is dispersed in both a first direction and an opposite second direction within the cavity prior to the fluid being channeled through the at least one channel into the combustion chamber.

2. A method in accordance with claim 1, wherein coupling an annular sleeve to the aft end further comprises aligning the at least one opening substantially obliquely with respect to the at least one channel.

3. A method in accordance with claim 1, further comprising coupling a flowsleeve radially outwardly from the combustor liner.

4. A method in accordance with claim 1, further comprising coupling a transition piece to the combustor liner.

5. A method in accordance with claim 1, wherein providing a combustor liner further comprises providing the combustor liner wherein the aft end includes an exterior surface and an interior surface.

6. A method in accordance with claim 5, wherein providing a combustor liner further comprises extending an upstream portion of the at least one channel from the aft end exterior surface to the centerline and extending a downstream portion of the at least one channel from the centerline to the aft end interior surface.

7. A combustor assembly for use in a turbine engine, said combustor assembly comprising:
   a combustor liner defining a combustion chamber therein, said combustor liner comprises a forward end and an aft end, wherein said aft end comprises at least one channel extending therethrough, said at least one channel is aligned obliquely with respect to a centerline extending through said aft end;
   a plurality of fuel nozzles extending through said forward end; and
   an annular sleeve substantially circumscribing said aft end such that a cavity is defined between said sleeve and said aft end, wherein said sleeve comprises at least one opening extending radially therethrough, said at least one opening is oriented such that a fluid channeled therethrough impinges against a surface of said aft end that is substantially parallel to the sleeve, wherein the fluid is dispersed in both a first direction and an opposite second direction within the cavity prior to the fluid being channeled through the at least one channel into said combustion chamber.

8. A combustor assembly in accordance with claim 7, wherein said at least one opening is oriented substantially obliquely with respect to said at least one channel.

9. A combustor assembly in accordance with claim 7, further comprising a flowsleeve coupled radially outwardly from said combustor liner.

10. A combustor assembly in accordance with claim 7, wherein said at least one channel comprises a plurality of channels extending substantially circumferentially about said aft end, said at least one opening comprises a plurality of openings spaced substantially circumferentially about said sleeve.

11. A combustor assembly in accordance with claim 7, wherein said aft end comprises an exterior surface and an interior surface.

12. A combustor assembly in accordance with claim 11, wherein said at least one channel comprises an upstream portion extending from said aft end exterior surface to said centerline and a downstream portion extending from said centerline to said aft end interior surface.

13. A combustor assembly in accordance with claim 12, wherein said channel upstream portion extends from said centerline at an angle of about 45 degrees with respect to said centerline and said channel downstream portion extends from said centerline at an angle of about 45 degrees with respect to said centerline.

14. A combustor assembly in accordance with claim 7, further comprising a transition piece coupled to said combustor liner.

15. A turbine engine comprising:
   a compressor; and
   a combustor coupled in flow communication with said compressor, said combustor comprising at least one combustor assembly comprising:
      a combustor liner defining a combustion chamber therein, said combustor liner comprises a forward end and an aft end, wherein said aft end comprises at least one channel extending therethrough, said at least one channel is aligned obliquely with respect to a centerline extending through said aft end;

a plurality of fuel nozzles extending through said forward end; and an annular sleeve substantially circumscribing said aft end such that a cavity is defined between said sleeve and said aft end, wherein said sleeve comprises at least one opening extending radially therethrough, said at least one opening is oriented such that a fluid channeled therethrough impinges against a surface of said aft end that is substantially parallel to the sleeve, wherein the fluid is dispersed in both a first direction and an opposite second direction within the cavity prior to the fluid being channeled through the at least one channel into said combustion chamber.

16. A turbine engine in accordance with claim 15, wherein said at least one combustor assembly further comprises a flowsleeve coupled radially outwardly from said combustor liner.

17. A turbine engine in accordance with claim 15, wherein said at least one channel comprises a plurality of channels extending substantially circumferentially about said aft end and said at least one opening comprises a plurality of openings spaced substantially circumferentially about said sleeve.

18. A turbine engine in accordance with claim 15, wherein said aft end comprises an exterior surface and an interior surface.

19. A turbine engine in accordance with claim 18, wherein said at least one channel comprises an upstream portion extending from said aft end exterior surface to said centerline and a downstream portion extending from said centerline to said aft end interior surface.

20. A turbine engine in accordance with claim 19, wherein said channel upstream portion extends from said centerline at an angle of about 45 degrees with respect to said centerline and said channel downstream portion extends from said centerline at an angle of about 45 degrees with respect to said centerline.

* * * * *